Figure 1:
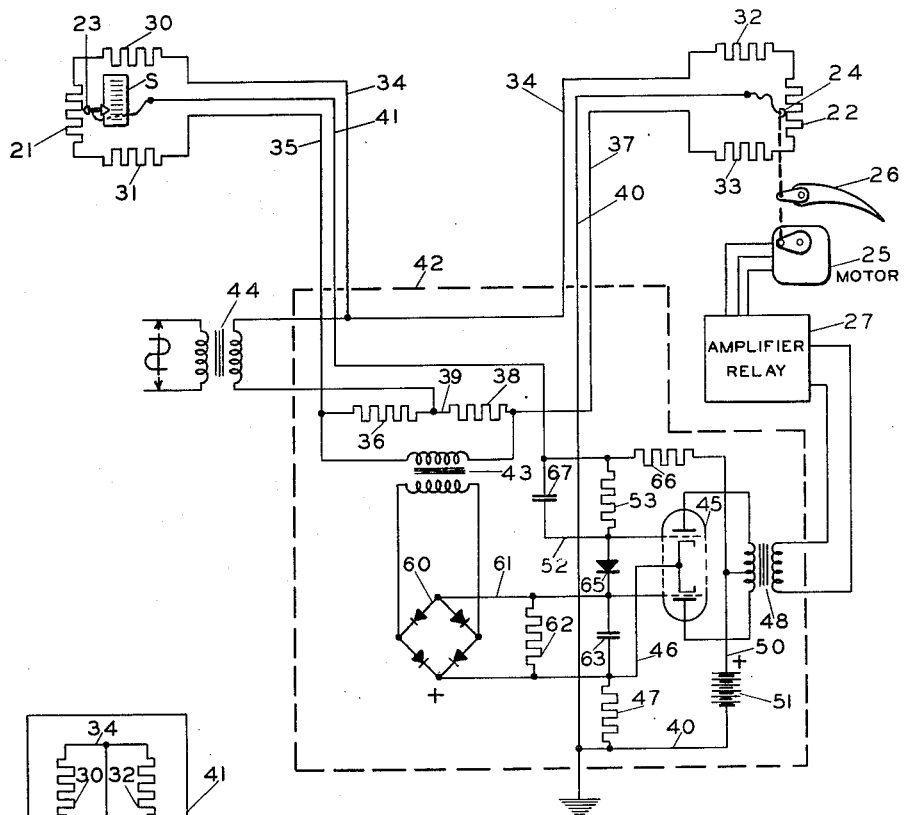

United States Patent Office 2,798,993
Patented July 9, 1957

2,798,993

FAIL-SAFE FOR REMOTE CONTROL SYSTEM

Warren E. Dion, Bristol, Conn., assignor to The Bristol Company, Waterbury, Conn., a corporation of Connecticut Application November 5, 1953, Serial No. 390,382

19 Claims. (Cl. 318—29)

This invention relates to electrical servomotor systems of the type suited for the setting of control members, valves, etc., such as in aircraft, as well as other installations and more particularly to such systems suitable for the positioning of control instrumentalities in response to either a manually determined setting of an element located presumably at an appreciable distance from the object to be moved or to conditions in an electrical network whose balance is made subject to a change in a variable to be measured and/or controlled.

In my copending application Serial No. 232,739, filed June 21, 1951, now Patent No. 2,710,933 granted June 14, 1955, I have set forth and described a servomotor system of the class to which the present invention is especially adaptable, and in addition to what may be termed a conventional or basic servomotor system incorporates among other features "fail-safe" characteristics whereby the desired safety of operation may be attained under certain conditions of circuit failure. I have now found that I can render such a system more nearly infallible in its response to possible faults in the electric circuits, especially those of the measuring network.

It is, therefore, a principal object of my invention to provide an electrical control system capable of substantially infallible discrimination between normal and abnormal conditions in its electrical circuit.

Another object is the provision of such a system which permits a wider latitude in the circuit components utilized therein while at the same time providing enhanced sensitivity as well as greatly improved reliability in operation.

A further object is the provision of such a system incorporating to a larger extent than heretofore both sensitivity to normal signals and insensitivity to abnormal signals resulting from faulty conditions.

In carrying out the purposes of the invention there is provided a balanceable electrical network having two pairs of terminal points, the potential across one of which pairs tends to approach a minimum value with attainment of normal balance and the potential across the other of which is ineffective so long as said network is free from electrical faults in the nature of open circuits, short circuits or grounds. There is associated with said respective pairs of terminal points substantially mutually independent instrumentalities of which the first is effective in response to normal unbalance conditions to initiate control means for restoring balance in the network, and the second is effective in response to electrical faults, to inhibit the control-initiating function of the first.

Figure 2:
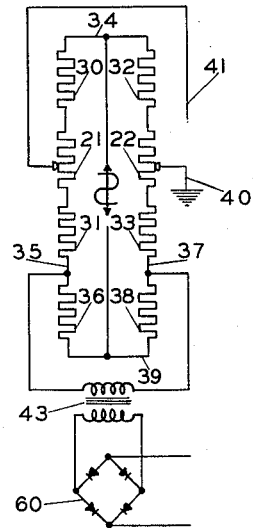

Additional objects and advantages of my invention will be apparent from the following detailed description of an embodiment thereof and the drawing in which:

Fig. 1 is a diagram showing application of the invention to one type of positioning or control system; and Fig. 2 is a schematic diagram of the bridge network shown in Fig. 1.

Referring now to the drawings, two adjustable voltage-dividing resistors or slide-wires 21, 22 have mutually compatible values. Slide-wire 21, hereinafter referred to as the "transmitting" slide-wire, has a translatable contact member 23 adapted to be positioned at will at any desired point between the terminals of its resistor. Slide-wire 22, hereinafter referred to as the "balancing" slide-wire, has a translatable contact 24 adapted to be positioned at any point between its terminals. Positioning of the contact 24 is effected by a reversible motor 25, to which is also attached, as shown, an element 26, such as a control surface of an aircraft, to be positioned as desired by operation of the system. The transmitting unit 21 may be fitted with a graduated scale S, which, in cooperation with a suitable index or pointer attached to the contact member 23, provides an indication of the set position of said contact. Immediate control of the motor 25 is effected through a suitable amplifier-relay device generally indicated at 27, and this may be of any one of a variety of such devices well known in the art of electric control and wherein the operation of said motor may be made directionally responsive to the phase position of an alternating voltage impressed upon the input terminals of said device.

In a conventional installation of apparatus of the class to which the invention is especially applicable, the respective components of the system, such as the slide-wires 21 and 22, the amplifier-relay device 27, the motor 25, and coordinating instrumentalities presently to be set forth, would normally be placed in more or less separated locations, necessitating interconnection by extended, and correspondingly exposed, electrical conductors. In this respect the basic system is particularly vulnerable, and one of the most important advantages of this invention resides in the avoidance of harzardous conditions which might otherwise result from the presence of a fault in the electrical conductors.

To the terminals of the transmitting slide-wire 21 are respectively connected one terminal each of two resistors 30 and 31, said two resistors preferably being located in the immediate proximity of the resistor 21. Similarly, to the terminals of the balancing slide-wire 22 are respectively connected one terminal each of two resistors 32 and 33, these, like the former two resistors, being located preferably in the immediate proximity of the associated slide-wire. The free terminals of the resistors 30 and 32 are interconnected by an extended conductor 34. To the free terminal of the resistor 31, by means of an extended conductor 35 is connected one terminal of a resistor 36, and to the free terminal of the resistor 33, by means of an extended conductor 37 is connected one extremity of a resistor 38. The other terminals of the resistors 36 and 38 are connected to a common conductor 39. In order that the full fail-safe property of the invention be obtained in installations which may be subjected to adverse forces of external origin, it is desirable that, while the resistors 30 and 31 are located near the slide-wire 21 at the transmitting station, and the resistors 32 and 33 with the balancing slide-wire, near the motor-control unit, the resistors 36 and 38 be in a less exposed location. The movable contact 24 of the slide-wire 22 is connected to a grounded conductor 40, and the movable contact 23 of the slide-wire 21 is connected by means of an extended conductor 41 to detector means comprised in a housed assembly or unit 42, and presently to be described. The resistors 36 and 38 may expediently be included in said assembly.

Between the conductors 35 and 37 is connected the primary winding of a transformer 43. The extended conductors 35, and 41 and a portion of the conductor 34 comprise the electrical connection between the transmitting unit of the system and the control assembly 42; and the conductors 37 and 40 and a further portion of the conductor 34 comprise the connection between the balancing unit and the control assembly. While these two sets of interconnecting conductors may be cabled for protection, their extended nature renders them unduly exposed to damage from external sources; and it is in the event of such damage that the invention finds one of its principal uses. Conditions of circuit failure in the network may be classified as either (1) the breaking of any conductor, (2) the grounding of any conductor, (3) accidental contact between conductors. In order that the apparatus may be "safe" under any of these conduitions, it is essential that upon the occurrence of such, or of any combination thereof, there result no spurious relay operation in the motor control system, in other words, that such occurrence be inhibited from producing a voltage or signal at the input terminals of the amplifier-relay device 27.

The resistors 30, 31, 32, 33, 36 and 38 may expediently be selected to have mutually equal values; and the voltage-dividing slide-wire resistors 21 and 22 may also be of equal values. With this arrangement, under normal conditions, application of alternating potential between the conductors 34 and 39 from an ungrounded source, as the secondary winding of a transformer 44, will produce no potential between the conductors 35 and 37, and the transformer 43 will remain deenergized. Also, whatever the translated position of either of the movable contacts 23—24, the other of said contacts may be so positioned as to reduce to zero the alternating potential between the conductor 41 and the grounded conductor 40. Furthermore, as will be discussed in more detail, the slight loading of the bridge network due to currents flowing in the slide-wire contacts under unbalance conditions occurring in normal operation will not produce between the conductors 35 and 37 a voltage sufficient to develop a significant output potential in the transformer 43.

For the purpose of detecting and amplifying the unbalance potential, or "error signal" derived from the bridge network, there is provided an electron discharge device 45 which may take the form of a double-triode having two sections, each with a cathode, an anode and a control grid, said sections being herein designated respectively the "upper" and the "lower" sections, as indicated in the drawing. The two cathodes, rendered electron-emissive by means not shown in the drawing, are connected to a common conductor 46 which, in turn, is connected to ground through a resistor 47. The anodes or plates of the device 45 are respectively connected to the terminals of the primary winding of a transformer 48, said winding having a center tap to which is connected a conductor 50 forming the positive terminal of a unidirectional electromotive force source 51 whose negative terminal is connected to ground. The secondary winding of the transformer 48 is directly connected to the input terminals of the amplifier-relay device 27.

The control electrode or grid of the "upper" section of the electron discharge device 45 is connected by a conductor 52 to a resistor 53, and thence to the conductor 41 leading from the movable contact member 23 of the transmitting slide-wire 21.

Inspection will show that the apparatus as thus far described may be made operative to position the contact member 24 in response to displacements of the contact member 23. Upon an alternating potential being impressed upon the bridge network from the source 44, and a unidirectional potential being impressed upon the electron discharge device and immediately associated components from the source 51, the "error signal" representing unbalance occasioned by non-corresponding positions of said contact members and concomitant unbalance of the network is impressed through the conductor 41 and the resistor 53 upon the control electrode of the "upper" section of the control device 45 in the form of an alternating potential corresponding in phase and intensity respectively to the sense and the magnitude of said unbalance. Thus, under the influence of the voltage of source 51, there will flow through the portion of the primary winding of transformer 48 which is connected to the anode or plate of said electron tube a pulsating current representative of said unbalance. The secondary output of said transformer will therefore correspond in phase and magnitude to the unbalance in the bridge network; and, circuit constants and mechanical connections being suitably selected, the motor 25, energized through the amplifier-relay 27 may be caused to adjust the position of contact member 24 along the resistor 22 to restore the electrical unbalance caused by displacement of the contact member 23 along the resistor 21. The "lower" section of the double triode 45 performs no amplifying function and serves only to provide a direct-current component to oppose that derived from the "upper" section of the tube and flowing in the primary winding of the transformer 48 tending thereby to produce conditions of saturation in the transformer core. No novelty is claimed for this method of nullifying undesirable saturation conditions in the magnetic circuit of the transformer; and any one of a number of other well known expedients for effecting an equivalent result may be substituted therefor without departing from the spirit of the invention.

Connected across the secondary terminals of the transformer 43 is a rectifier 60, preferably of the full-wave type, having its positive terminal connected to the conductor 46 and its negative terminal to a conductor 61, to which also is connected the control electrode of the "lower" section of the double triode 45. Across the D.-C. terminals of said rectifier—i. e., between the conductors 46 and 61, are connected in parallel a resistor 62 and a capacitor 63. Between the conductors 52 and 61 is a diode rectifier 65 having its anode connected to the former, and its cathode to the latter, of said conductors. Between the conductors 50 and 41 is connected a resistor 66 having a value of a much higher order of magnitude than any of the component resistors of the bridge network.

While it will be appreciated that the herein described circuit is subject to considerable flexibility in design, with a correspondingly broad selection of component constants, typical values exemplifying a practical system suited to use on an operating frequency of 400 cycles per second, with a considerable latitude above and below that frequency, are shown in the following tabulation:

Transformers:
  43_____ 10,000 ohms pri.: ⅙ turns-ratio.
  44_____ (Bridge supply) 36 volts secondary.
  48_____ 20,000 ohms pri.: mid-tapped: ⅙ turns-ratio.
Resistors:
  21, 22_____ 1,000 ohm slide-wires.
  30, 31, 32, 33, 36, 38_____ 1,000 ohm units.
  47_____ 330 ohms.
  53, 62_____ 470,000 ohm units.
  66_____ 1 megohm.
Capacitor 63_____ 0.1 mfd.
Vacuum tube 45___ "Medium mu" dual triode, type 6021.

Since there are no taps between any two of the resistors 21, 30, 31, these units may be considered as comprising a single impedance having a middle section of about one-third its total value in the form of a voltage-dividing slide-wire. Similarly, the combination of units 22, 32, 33 may be treated as a single impedance with its middle third in the form of a voltage divider. The balanceable network thus comprises a Wheatstone bridge having the following four arms:

30 + a portion of 21
36 + 31 + the remaining portion of 21
32 + a portion of 22
38 + 33 + the remaining portion of 22

Under balance conditions in the network, not only will the slide-wire contacts 23 and 24 be at a common potential, but no voltage will exist between the "outside" terminals of the interconnected resistors 36—38. At the same time, the variable range of the slide-wires 21 and 22 being but a portion of the total impedance of the network, and the detector system connected between the slide-wire contacts having, as is the custom, a relatively high impedance, the current therethrough will be limited to a small value which will render negligible any voltage which may thereby be impressed upon the transformer 43.

Operation of the system under normal conditions has already been briefly outlined, and may now be discussed in somewhat more detail. With the value of the resistor 66 so selected that the normal flow of unidirectional current therethrough under quiescent conditions of the tube 45 will bias the diode rectifier 65 to a condition of negligible conductance, the impedance of the circuit branch in which the latter is included will remain so high as to provide no significant shunting of the control electrode of the upper section of the double triode 45, and substantially the whole of such voltage as may appear between the conductors 41 and 40 due to an unbalance signal such as will be derived from relative displacement of the movable contact members 23 and 24 will be available as a controlling signal. Incidentally, the function of the resistor 62 connected across the D. C. terminals of the rectifier unit 60 is to shunt the high unilateral impedance of said unit, thus under normal operating conditions, maintaining conductor 61 at the same D. C. potential as conductor 46 and ensuring the proper biasing potential upon the diode rectifier 65.

It may here be noted that the mechanical structure of the diode rectifier 65 may influence the selection of associated components in the electrical circuit. Some such rectifiers, as the copper oxide and the selenium types, comprising closely spaced conducting plates, are characterized by considerable electrical capacitance; and such a component constituting the rectifier 65 combined as shown with the resistor 53 may introduce undesirable phase-shift in the signal impressed upon the control electrode of the amplifying tube. This shift, if present, may be compensated for by placing a suitably selected capacitor 67 in parallel with the resistor 53. If the rectifier 65 takes the form of a point-contact diode, its capacitance will be negligible, and the capacitor 67 may be omitted.

Reference to the diagrams, especially that of Fig. 2, will show that under normal circuit conditions the bridge network comprising the eight interconnected resistors energized from the source 44 or, as has been more concisely stated, the four-armed bridge wherein said resistors are connected in a divided circuit, will be balanced to the extent that no appreciable potential is impressed upon the primary winding of the transformer 43. Moreover, it will be seen that an open circuit or a short circuit in any one of said resistors or associated interconnecting conductors will result in an unbalance condition sufficient to impress a significant potential upon said winding. Since the conductor 40, connected to the contact of slide-wire 22, is grounded, a ground in any of the resistors or interconnecting leads will partake of the characteristics of a short circuit, and will likewise result in such an unbalance and a resultant application of voltage to the transformer 43. It may here be observed that, with circuit parameters of the order given in the preceding tabulation of typical values, the loading of the bridge by the amplifier system is insufficient to modify the impedance of the bridge arms to an extent that variations in the positions of the contacts 23 and 24 have appreciable effect on the voltage impressed upon the primary winding of the transformer 43.

As previously pointed out, the diode rectifier 65 is normally biased to a condition of negligible conductance, allowing substantially the full voltage of the signal impressed upon the conductor 41 to be applied to the control electrode of the tube 45. Upon energization of the transformer 43, however, its output voltage, rectified in the full-wave rectifier 60 and impressed between the conductors 61—46 in a sense to make the former more negative, will build up a potential across the capacitor 63, altering the bias upon the diode rectifier 65, whereby the latter tends to become conductive and provide a shunt across the grid circuit of the upper section of the tube 45. The impedance of the capacitor 63 being low in comparison with that of the resistor 53, the major part of the potential impressed between the conductors 41 and 46 will be absorbed in the resistor, with a consequent significant reduction of signal strength available for control purposes. In short, as the voltage impressed upon the primary winding of the transformer 43 reaches a predetermined critical magnitude the sensitivity of the amplifier will be more or less abruptly reduced to an extent to inhibit operation of the motor 25. Thus, upon the occurrence of any of the above-enumerated circuit faults, the motor will be brought to rest, and the obejct normally positioned thereby will remain locked in the position it occupied at the instant the fault developed.

Attention may now be given to conditions attending such faults as may develop in either of the slide-wire contact leads 40—41. The former being permanently grounded, it is obvious that a ground on the latter will serve to effectively short-circuit any signal potential which might be derived from the bridge, and render the electron tube inoperative to perform any control function. Since an open circuit in either of the conductors 40—41 could be attended by a residual and unpredictable signal on the tube 45, a further characteristic of the network is relied upon for protection in such eventuality. It will be observed that the control electrode of the upper section of the tube 45 is returned to ground through resistor 53 in series with the resistance of the bridge network between the slide-wire contacts. The latter resistance, comprising the two branches of the bridge in parallel, will be of the order of a few thousand ohms. Potential from the positive terminal of the source 51, impressed through the conductor 50 and the resistor 66 upon the conductor 41 and thence through the bridge network to ground, will be substantially wholly absorbed in said resistor, which is of a much higher order of magnitude than the resistance of the bridge network, and will thus have the effect of biasing the control electrode of the tube 45 substantially at or just below cut-off. Furthermore, the potential available on the load side of resistor 66 is insufficient to render diode rectifier 65 conductive. Upon the occurrence of an open circuit in either of the conductors 40—41, the ground connection through the bridge network will be interrupted, and a much larger portion of the voltage of the source 51 will be impressed upon the diode rectifier 65, with a polarity to render the same conductive to the extent of shunting the grid of the upper section of the tube 45 and effectively bypassing any A.-C. signal which may find its way to the conductor 52, whereby under such a condition to render the motor system inert and incapable of adjusting the position of the element 26.

The terms and expressions which I have employed are used as terms of description and not of limitation, and I have no intention, in the use of such terms and expressions of excluding any equivalents of the features shown and described or portions thereof, but recognize that various modifications are possible within the scope of the invention claimed.

I claim:

1. In an electrical control system including a balanceable network having at least two variable impedances one of which may be varied independently of condtions in said network and thereby unbalance the network and generate a normal unbalance signal to energize a load circuit which incidentally adjusts the other of said impedances to restore the balance of the network, means forming electrically discrete normally equipotential points in said network spaced from said variable impedances, potential associated with said normal unbalance signal appearing across said points, circuit means forming a shunt path for said signal and including a voltage-sensitive normally non-conductive element, and means coupled to said network across said normally equipotential points for deriving a potential corresponding to the potential appearing between said points and applying the same to said voltage-sensitive element, said voltage-sensitive element becoming conductive when a potential in excess of that associated with normal unbalance of said network appears across said points.

2. In an electrical control system including a balanceable network having at least two variable impedances one of which may be varied independently of conditions in said network and thereby unbalance the network and generate a normal unbalance signal to energize a load circuit which incidentally adjusts the other of said impedances to restore the balance of the network, means forming electrically discrete normally equipotential points in said network remote from said variable impedances, potential associated with said normal unbalance signal appearing across said points, circuit means forming a shunt path for said signal and including a voltage-sensitive normally non-conductive element, and means coupled to said network across said normally equipotential points for deriving a further potential corresponding to the potential appearing between said points under conditions of circuit abnormality and applying the same to said voltage-sensitive element, said voltage-sensitive element becoming conductive when a potential in excess of that associated with normal unbalance of said network appears across said points.

3. In an electrical control system including a balanceable network having at least two variable impedances one of which may be varied independently of conditions in said network and thereby unbalance the network and generate a normal unbalance signal to energize a load circuit which incidentally adjusts the other of said impedances to restore the balance of the network, other impedance means forming normally equipotential discrete points in said network, circuit means forming a shunt path for said signal and including a non-linear voltage-sensitive element substantially non-conductive to potentials associated with said normal unbalance signal, and means coupled to said network across said normally equipotential points for deriving a further potential substantially distinct from the normal unbalance signal and corresponding to the potential appearing between said points under conditions of circuit abnormality and impressing the same on said voltage-sensitive element, said voltage-sensitive element being conductive when a potential corresponding to an abnormal unbalance condition appears across said points and is impressed thereon.

4. In an electrical control system including a balanceable network having at least two variable impedances one of which may be varied independently of conditions in said network and thereby unbalance the network and generate a normal unbalance signal to energize a load circuit which incidentally adjusts the other of said impedances to restore the balance of the network, means forming on said network normally equipotential discrete points spaced from said variable impedances, circuit means forming a shunt path for said signal and including a non-linear voltage-sensitive element, means for biasing said voltage-sensitive element to non-conductivity with respect to said normal unbalance signal, means coupled to said network across said normally equipotential points for deriving a potential corresponding to the potential appearing between said points and impressing the same on said voltage-sensitive element, said potential being impressed on said voltage-sensitive element in a sense to render the same conductive in the presence of abnormal unbalance conditions resulting from defects in any one of said impedances and connections therebetween.

5. In an electrical control system including a balanceable network having at least two variable impedances one of which may be varied independently of conditions in said network and thereby unbalance the network and generate a normal unbalance signal to energize a load circuit which incidentally adjusts the other of said impedances to restore the balance of the network, means forming on said network normally equipotential discrete points spaced from said variable impedances, circuit means forming a shunt path for said signal and including a non-linear voltage-sensitive element, means for biasing said voltage-sensitive element to non-conductivity with respect to said normal unbalance signal, means coupled to said network across said normally equipotential points for deriving a potential corresponding to the potential appearing between said points and impressing the same on said voltage-sensitive element, said last mentioned means including a transformer the primary winding of which being connected across said discrete points and the secondary winding of which being coupled to one side of said voltage-sensitive element to impress potential thereon in a sense to render the same conductive in the presence of abnormal unbalance conditions resulting from defects in any one of said impedances and connections therebetween.

6. In electrical apparatus for controlling the position of a movable element and of the class including a balanceable network having at least two variable impedances one of which may be varied independently of conditions in said network, motor means adapted to move said element and incidentally to adjust the other of said two impedances to affect the balance of said network, terminals at discrete points in said network and adapted to be subjected to a potential difference for energizing the same, detector-relay means connected to said network at other discrete points and responsive to normal unbalance conditions introduced by changes in said variable impedances to activate said motor means to move said element and incidentally to adjust said other impedance in a sense to restore in said network a balance disturbed by variation of said first variable impedance; the improvement comprising further impedance components included in said network the total impedance of which being substantially greater than any possible impedance variation due to normal changes in said variable impedances, voltage-sensitive means adapted to inhibit response of said detector-relay means to unbalance conditions, and electrical connections between said voltage-sensitive means and further and normally equipotential discrete points on said network for impressing upon said voltage-sensitive means potential differences resulting from extreme unbalance conditions attendant upon defects in any one of said impedances and connections therebetween.

7. In electrical apparatus for controlling the position of a movable element and of the class including a balanceable network having at least two variable impedances one of which may be varied independently of conditions in said network, motor means adapted to move said element and incidentally to adjust the other of said two impedances to affect the balance of said network, terminals at discrete points in said network and adapted to be subjected to a potential difference for energizing the same, detector-relay means connected to said network at other discrete points and responsive to normal unbalance conditions introduced by changes in said variable impedances to activate said motor means to move said element and incidentally to adjust said other impedance in a sense to restore in said network a balance disturbed by variation of said first variable impedance; the improvement comprising further impedance components included in said network the total impedance of which being substantially greater than any possible impedance variation due to normal changes in said variable impedances, voltage-sensitive means adapted to inhibit response of said detector-relay means to unbalance conditions, said voltage-sensitive means being substantially non-responsive to normal potential differences appearing between said normally equipotential discrete points during unbalance conditions caused by variation of said first variable impedance, and electrical connections between said voltage-sensitive means and further and normally equipotential discrete points on said network for impressing upon said voltage-sensitive means potential differences resulting from extreme unbalance conditions attendant upon defects in any one of said impedances and connections therebetween.

8. In electrical apparatus for controlling the position of a movable element and of the class including a balanceable network having at least two variable impedances one of which may be varied independently of conditions in said network, motor means adapted to move said element and incidentally to adjust the other of said two impedances to affect the balance of said network, terminals at discrete points in said network and adapted to be subjected to an alternating potential difference for energizing the same, detector-relay means connected to said network at other discrete points and responsive to alternating potentials evolving from normal unbalance conditions introduced by changes in said variable impedances to activate said motor means to move said element and incidentally to adjust said other impedance in a sense to restore in said network a balance disturbed by variation of said first variable impedance; the improvement comprising further impedance components included in said network the total impedance of which being substantially greater than any possible impedance variation due to normal changes in said variable impedances, unidirectional-voltage-sensitive means adapted to inhibit the response of said detector-relay means to said alternating potentials, means including electrical connections to further, and normally equipotential, discrete points on said network, for impressing upon said voltage-sensitive means unidirectional potentials corresponding to voltages between said last-named points resulting from extreme unbalance conditions attendant upon defects in any one of said impedances and connections therebetween.

9. In electrical apparatus for controlling the position of a movable element and of the class including a balanceable network having at least two variable impedances one of which may be varied independently of conditions in said network, motor means adapted to move said element and incidentally to adjust the other of said two impedances to affect the balance of said network, terminals at discrete points in said network and adapted to be subjected to a potential difference for energizing the same, detector-relay means connected to said network at other discrete points and comprising an electron discharge device having an anode, a cathode and a control electrode responsive to potential between said other discrete points due to normal unbalance conditions introduced by changes in said variable impedances to activate said motor means to move said element and incidentally to adjust said other impedance in a sense to restore in said network a balance disturbed by variation of said first variable impedance; the improvement comprising further impedance components included in said network the total impedance of which being substantially greater than any possible variation due to normal changes in said variable impedances, a shunt member having conductivity dependent upon voltage impressed thereon and connected between said cathode and said control electrode, means for normally maintaining said shunt member in a nonconductive state, and electrical connections for impressing upon said shunt member potential differences corresponding to voltages between further, and normally equipotential points in said network resulting from extreme unbalance conditions attendant upon defects in any one of said impedances and connections therebetween whereby to render said shunt member relatively conductive and inhibit the response of said electron discharge device to potentials representing abnormal unbalance conditions.

10. In electrical apparatus for controlling the position of a movable element and of the class including a balanceable network having at least two variable impedances one of which may be varied independently of conditions in said network for developing a control signal, motor means adapted to move said element and incidentally to adjust the other of said two impedances to affect the balance of said network, terminals at discrete points in said network and adapted to be subjected to an alternating potential difference for energizing the same, detector-relay means connected to said network at other discrete points and comprising an electron discharge device having an anode, a cathode and a control electrode, connections for impressing between said cathode and control electrode control signal potentials due to unbalance of said network, a shunt circuit for bypassing the alternating component of said control signal potentials away from said control electrode of said tube, said shunt circuit including an element normally inhibiting said bypassing action, constant impedance means included in said network and normally without influence upon its balance condition to affect said control signal and providing points electrically separated but normally at a common potential and subject to a substantial potential gradient under abnormal conditions, connections between said last mentioned points and said shunt circuit for impressing the potential between said points upon said element in a sense to reduce its inhibiting action, thereby causing a greater proportion of said alternating potential to be shunted from said control electrode with a corresponding reduction of the effective amplification of said electronic device, and relay means responsive to current flow in the anode of said device for controlling the operation of said motor means.

11. In electrical apparatus for controlling the position of a movable element and of the class including a balanceable network having at least two variable impedances one of which may be varied independently of conditions in said network for developing a control signal, motor means adapted to move said element and incidentally to adjust the other of said two impedances to affect the balance of said network, terminals at discrete points in said network and adapted to be subjected to an alternating potential difference for energizing the same, detector-relay means connected to said network at other discrete points and comprising an electron discharge device having an anode, a cathode and a control electrode, connections for impressing between said cathode and control electrode control signal potentials due to unbalance of said network, a shunt circuit for bypassing the alternating component of said control signal potentials away from said control electrode of said tube, said shunt circuit including an element normally inhibiting said bypassing action, constant impedance means included in said network and normally without influence upon its balance condition to affect said control signal and providing points electrically separated but normally at a common potential and subject to a substantial potential gradient under abnormal conditions, connections between said last mentioned points and said shunt circuit for impressing the potential between said points upon said element in a sense to reduce its inhibiting action, said element having a non-linear impedance characteristic and being substantially non-responsive to normal potential differences appearing between said last mentioned points during unbalance conditions caused by variation of said first variable impedance, and relay means responsive to current flow in the anode of said device for controlling the operation of said motor means.

12. In electrical control apparatus for positioning an element in response to variation in the relative value of two impedances, two further impedances adapted to have their relative value varied by changes in the position of said element, a balanceable bridge network including said variable impedances and further impedance elements with the total impedance of said network being substantially greater than any possible variation due to normal changes in said variable impedances, a source of electromotive force connected to said network at discrete points, detector-relay means connected to said network at other discrete points and responsive to unbalance conditions introduced by changes in said variable impedances to position said element and incidentally to vary the relative value of said further impedances in a sense to restore in said network a balance disturbed by relative variation of said first-named impedances, voltage-responsive means for inhibiting the response of said detector-relay means, and voltage-applying electrical connections between said last named voltage-responsive means and discrete and normally equipotential points on said network.

13. In electrical control apparatus, a bridge network comprising at least six impedance components interconnected in a continuous loop and having six intermediate terminals alternating therewith, said network being adapted to be so balanced that upon application of potential between two opposite terminals the two terminals adjacent one of said opposite terminals will attain a common potential and the two terminals adjacent the other of said opposite terminals will attain a common potential, first voltage-responsive means connected between said first two equipotential terminals and adapted to initiate a control effect, second voltage-responsive means connected between said second two equipotential terminals and adapted to inhibit the control effect-initiating function of said first voltage-responsive means.

14. In an electrical control system including a balanceable network having at least two variable impedances one of which may be varied independently of conditions in said network and thereby unbalance the network and generate a normal unbalance signal to energize a load circuit which incidentally adjusts the other of said impedances to restore the balance of the network, voltage-responsive means for energizing said load circuit in response to said signal, a source for applying a biasing potential to said voltage-responsive means, a further impedance having a given value substantially greater than any impedance due to normal changes in said variable impedances connected on one side to one side of said source and having a load side thereof electrically connected to said voltage-responsive means, said signal being coupled to said voltage-responsive means on the load side of said further impedance whereby a small portion of said potential is normally superposed on said signal, circuit means forming a shunt path for said signal and connected on one side thereof to the load side of said further impedance and connected on the other side thereof to the other side of said source, said circuit means including a voltage-sensitive normally non-conductive element with the potential normally across said voltage-sensitive element being insufficient to render the same conductive and the occurrence of a break in said network impressing a larger potential from said source across said voltage-sensitive element thereby rendering said voltage-sensitive element conductive.

15. In an electrical control system, a balanceable impedance network having two terminals for having a signal potential developed therebetween and corresponding to the departure of said network from a balanced condition, a load circuit, voltage-responsive means for developing currents in said load circuit corresponding to said signal potential, electrical means coupling said two terminals to said voltage-responsive means, a voltage-sensitive variable impedance coupled to said electrical means in shunt with said voltage-responsive means, said voltage-sensitive variable impedance being normally substantially non-conductive, a voltage source connected to said network, a high impedance substantially greater than any impedance which may normally occur in said network in series between said source and said network with a relatively small portion of said voltage being normally superposed on said signal potential and the occurrence of an interruption of said electrical means is accompanied by a substantially larger portion of said voltage being impressed across said voltage-sensitive variable impedance.

16. In an electrical control system including a balanceable network having at least two variable impedances one of which may be varied independently of conditions in said network and thereby unbalance the network and generate a normal unbalance signal to energize a load circuit which incidentally adjusts the other of said impedances to restore the balance of the network, means forming on said network normally equipotential discrete points, an electron discharge device having a cathode, anode and control electrode with the anode and cathode in said load circuit, conductive means for impressing said signal potential on said control electrode, a source of unidirectional voltage connected between said cathode and anode, a relatively high resistive impedance connected in series between said source and said control electrode with said resistive impedance substantially greater than any impedance which may appear in said network due to normal changes in said variable impedances, a normally non-conductive diode rectifier connected on one side between said resistive impedance and control electrode and forming a shunt path for said signal potential, whereby said diode rectifier is rendered conductive when an interruption occurs in said conductive means due to a substantially greater portion of said unidirectional voltage being impressed thereon and thereby shunting said control electrode.

17. In an electrical control system as set forth in claim 16, said network being adapted for energization from a source of alternating current, means defining discrete equi-potential points in said network, a transformer having a primary and secondary winding with the primary winding coupled across said points, and means coupling the secondary winding to said diode rectifier for impressing potential thereon corresponding to the potential appearing across said points when said network is unbalanced, said diode rectifier being substantially non-conductive to normal unbalance potentials but conductive to excessive potentials resulting from a defect in any one of said impedances and connections therebetween.

18. In an electrical control system as set forth in claim 17, and said means coupling said secondary winding to said diode rectifier comprises a full wave rectifier connected across said secondary winding and coupled to said diode rectifier.

19. In an electrical control system, an impedance network having two terminals adapted for energization from a source of alternating current and two terminals adapted to have developed therebetween an alternating signal potential derived from said source and depending in phase and magnitude upon the departure of said network from a balanced condition, an electron discharge device having a cathode, an anode and a control electrode, a load circuit including said anode and cathode, conductive connection means between said last-named two terminals and said cathode and control electrode respectively whereby said signal potentials determine representative currents in said load circuit, a unidirectional-voltage-sensitive variable impedance shunted between said cathode and control electrode, means for normally biasing said impedance to a substantially non-conductive state, a source of unidirectional voltage connected to said network in series with a relatively high impedance, whereby a negligible portion of said voltage is normally superposed on said signal potentials, and whereby in the event of interruption of said connection means a substantially greater portion of said unidirectional voltage is impressed upon said variable impedance to bias the same to a condition of conductance, with a corresponding reduction in the effective amplification of said electron discharge device.

References Cited in the file of this patent
UNITED STATES PATENTS

| 2,634,391 | Rusler | Apr. 7, 1953 |
| 2,673,314 | MacCallum | Mar. 23, 1954 |
| 2,710,933 | Dion | June 14, 1955 |